United States Patent
Dhanakshirur et al.

(10) Patent No.: US 10,079,719 B2
(45) Date of Patent: Sep. 18, 2018

(54) AUTOMATICALLY TUNING MIDDLEWARE IN A MOBILEFIRST PLATFORM RUNNING IN A DOCKER CONTAINER INFRASTRUCTURE

(71) Applicant: INTERNATIONAL BUSINESS MACHINES CORPORATION, Armonk, NY (US)

(72) Inventors: Girish Dhanakshirur, Bangalore (IN); Josephine E. Justin, Bangalore (IN); Shinoj Zacharias, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 15/196,699

(22) Filed: Jun. 29, 2016

(65) Prior Publication Data
US 2018/0006886 A1   Jan. 4, 2018

(51) Int. Cl.
| | |
|---|---|
| H04L 12/24 | (2006.01) |
| H04L 29/08 | (2006.01) |
| H04L 12/803 | (2013.01) |
| H04L 12/26 | (2006.01) |
| H04L 12/861 | (2013.01) |

(Continued)

(52) U.S. Cl.
CPC ...... *H04L 41/0816* (2013.01); *G06F 9/44521* (2013.01); *G06F 9/45504* (2013.01); *H04L 43/10* (2013.01); *H04L 47/125* (2013.01); *H04L 49/90* (2013.01); *H04L 67/2895* (2013.01)

(58) Field of Classification Search
CPC .................................................. H04L 41/0816
See application file for complete search history.

(56) References Cited

U.S. PATENT DOCUMENTS 6,539,427 B1 * 3/2003 Natarajan ............... H04L 41/00
    709/223
7,827,539 B1   11/2010 Wygodny et al.
(Continued)

OTHER PUBLICATIONS

Roman, Manuel et al.; Dynamically Programmable and Reconfigurable Middleware Services; Middleware 2004; ACM/IFIP/USENIX International Middleware Conference; Oct. 18-22, 2014; pp. 372-396.
(Continued)

*Primary Examiner* — Arvin Eskandarnia
(74) *Attorney, Agent, or Firm* — Schmeiser, Olsen & Watts; John Pivnichny

(57) ABSTRACT

An approach is provided for tuning middleware. Performance-related settings are loaded. Performance data of the middleware of a MobileFirst Platform (MFP) running in a docker container infrastructure is received. The performance data is collected by agents installed in container groups. Based on the performance data, a performance issue in one of the container groups is identified and a server included in the one container group is identified as a source of the performance issue. Recommendations are generated for tuning the middleware by modifying one or more of the performance-related settings. While the middleware is running in the docker container infrastructure, one of the recommendations is applied to modify one of the performance-related settings which dynamically tunes the middleware, thereby resolving the performance issue.

20 Claims, 4 Drawing Sheets

(51) Int. Cl.
G06F 9/445 (2018.01)
G06F 9/455 (2018.01)

(56) References Cited

U.S. PATENT DOCUMENTS

| | | | |
|---|---|---|---|
| 8,621,052 B2 | 12/2013 | Keohane et al. | |
| 8,645,945 B2 | 2/2014 | Diament et al. | |
| 8,707,304 B2 | 4/2014 | Ashok et al. | |
| 2013/0103973 A1* | 4/2013 | Werth | G06F 9/5072 |
| | | | 714/2 |
| 2014/0038632 A1* | 2/2014 | Weigand | H04L 41/06 |
| | | | 455/452.2 |
| 2014/0372977 A1 | 12/2014 | Cai et al. | |

OTHER PUBLICATIONS

Chung, I-Hsin et al.; Automated Cluster-Based Web Service Performance Tuning; 13th IEEE International Symposium on High Performance Distributed Computing; Jun. 4-6, 2004; pp. 36-44.

Ferrari, Giovanna et al.; An Approach to Adaptive Performance Tuning of Application Servers; Workshop on Quality of Service for Application Servers in conjunction with 23rd Symposium on Reliable Distributed Systems; Oct. 17, 2004; pp. 7-12.

* cited by examiner

AUTOMATICALLY TUNING MIDDLEWARE IN A MOBILEFIRST PLATFORM RUNNING IN A DOCKER CONTAINER INFRASTRUCTURE

BACKGROUND

The present invention relates to tuning the performance of middleware, and more particularly to automatically tuning mobile middleware running in a Docker container infrastructure.

To improve its performance, a MobileFirst Platform (MFP) Foundation component (e.g., a server based app) must be fine-tuned, which includes configuring multiple performance parameters based on the environment in which the MFP component is running and the throughput of mobile middleware. In known tuning techniques, the performance parameters are manually set before running the MFP servers. When many MFP containers are running in a cluster environment, a load balancer distributes the workload across multiple MFP servers that are running in a container group, but each MFP component itself needs to be fine-tuned to improve performance. Tuning is required for a JAVA® Virtual Machine (JVM®) used by the application server, Hypertext Transfer Protocol (HTTP) connections, back-end connections, MFP internal configurations for session time outs and heartbeats, queue size, and number of queues for the Analytics server. JVM and JAVA are registered trademarks owned by Oracle America, Inc. located in Redwood Shores, Calif.

SUMMARY

In a first embodiment, the present invention provides a method of tuning middleware. The method includes a computer loading performance-related settings. The method further includes the computer receiving performance data specifying a performance of the middleware of a MobileFirst platform (MFP) running in a docker container infrastructure. The performance data is collected by agents installed in container groups included in the docker container infrastructure. The agents collect the performance data from multiple servers included in the container groups. The method further includes based on the received performance data, the computer identifying a performance issue in one of the container groups and identifying a server included in the one container group as being a source of the identified performance issue. The method further includes the computer generating a set of recommendations for tuning the middleware by modifying one or more of the performance-related settings. The method further includes while the middleware is running in the docker container infrastructure, the computer applying one of the recommendations in the set of recommendations, which modifies one of the performance-related settings which is associated with the identified server. The modified performance-related setting dynamically tunes the middleware, which resolves the identified performance issue.

In a second embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of tuning middleware. The method includes a computer system loading performance-related settings. The method further includes the computer system receiving performance data specifying a performance of the middleware of a MobileFirst platform (MFP) running in a docker container infrastructure. The performance data is collected by agents installed in container groups included in the docker container infrastructure. The agents collect the performance data from multiple servers included in the container groups. The method further includes based on the received performance data, the computer system identifying a performance issue in one of the container groups and identifying a server included in the one container group as being a source of the identified performance issue. The method further includes the computer system generating a set of recommendations for tuning the middleware by modifying one or more of the performance-related settings. The method further includes while the middleware is running in the docker container infrastructure, the computer system applying one of the recommendations in the set of recommendations, which modifies one of the performance-related settings which is associated with the identified server. The modified performance-related setting dynamically tunes the middleware, which resolves the identified performance issue.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of tuning middleware. The method includes a computer system loading performance-related settings. The method further includes the computer system receiving performance data specifying a performance of the middleware of a MobileFirst platform (MFP) running in a docker container infrastructure. The performance data is collected by agents installed in container groups included in the docker container infrastructure. The agents collect the performance data from multiple servers included in the container groups. The method further includes based on the received performance data, the computer system identifying a performance issue in one of the container groups and identifying a server included in the one container group as being a source of the identified performance issue. The method further includes the computer system generating a set of recommendations for tuning the middleware by modifying one or more of the performance-related settings. The method further includes while the middleware is running in the docker container infrastructure, the computer system applying one of the recommendations in the set of recommendations, which modifies one of the performance-related settings which is associated with the identified server. The modified performance-related setting dynamically tunes the middleware, which resolves the identified performance issue.

Embodiments of the present invention provide automatic tuning of MFP middleware running in a docker container infrastructure to improve performance of the MFP middleware.

DETAILED DESCRIPTION

Overview

Figure 1:
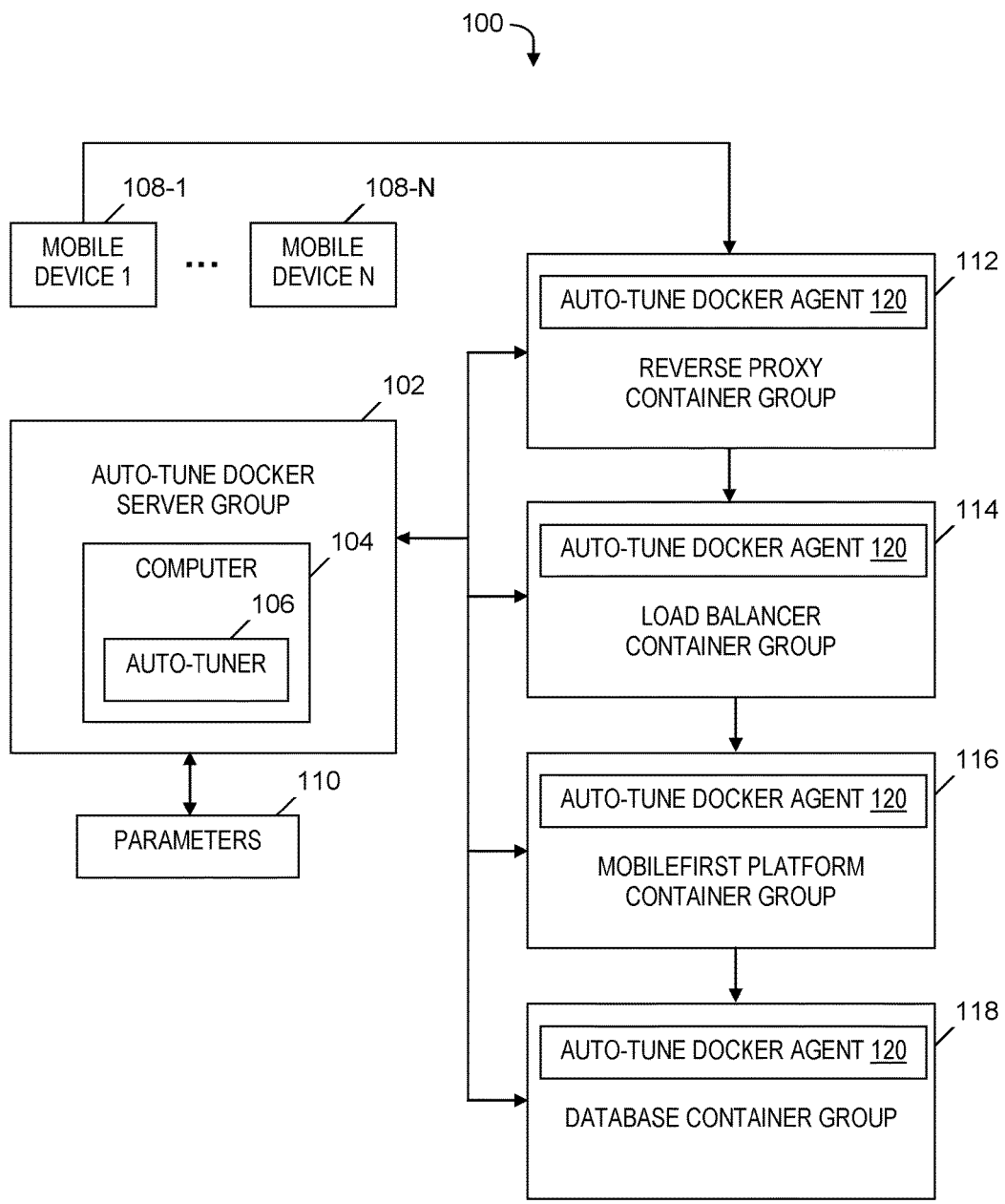
FIG. 1 is a block diagram of a system for automatically tuning middleware, in accordance with embodiments of the present invention.

Manually fine-tuning MFP components is a challenge when the MFP components are running in a Docker container infrastructure, where multiple MFP containers run in a cluster environment. Embodiments of the present invention overcome this challenge by providing an automatic tuning of MFP middleware running in a Docker container infrastructure by collecting performance parameters of the MFP middleware. Auto-tune agents running in Docker container groups collect Docker configuration data, including memory and allocated storage, and runtime data about the MFP middleware. The runtime data may specify the heap size of the JVM®, HTTP connections, queue size, back-end connections, etc. An auto-tuner collects the runtime data from the auto-tune agents at different stages of execution in server groups running in respective Docker container groups.

The auto-tuner analyzes the runtime data to identify performance issues and automatically adjusts MFP middleware configuration parameters at runtime to improve performance of the MFP middleware running in container groups. The analysis of the runtime data also specifies optimal pre-load configurations for running the container groups. The analysis of the runtime data may include comparisons to expected behavior of the configuration parameters based on the usage pattern of particular mobile app users. For example, during a festive session, customers in India may complete a large number of sales transactions via the mobile app, thereby initiating a significant number of requests being sent to the MFP middleware. In this case, the auto-tuner increases the HTTP connections in the MFP middleware to handle the bulk of the requests. Similarly in other regions such as the United States, customers may complete a large number of sales transactions during, for example, a Black Friday sales event, which results in a substantial number of requests sent to the MFP middleware. In response to the large number of requests, the auto-tuner tunes parameters to optimize the user experience. The aforementioned adjustment of middleware configuration parameters includes applying the performance-tuned parameters to server groups running in Docker containers. Embodiments of the present invention provide the aforementioned tuning in an automated (i.e., non-manual) manner, where the tuning is not based on a request from a particular user or entity.

A MobileFirst Platform is used to build mobile apps. A server on a MobileFirst Platform is mobile-optimized middleware that serves a gateway between applications, back-end systems and cloud-based services. Docker is a tool that packages an application and its dependencies in a virtual container that runs on any Linux® server. Linux is a registered trademark of Linus Torvalds in the United States and other countries. A Docker container is a virtualization of an operating system (i.e., provides an additional layer of abstraction and automation of operating system-level virtualization.

System for Automatically Tuning Mobile Middleware

FIG. 1 is a block diagram of a system 100 for automatically tuning middleware, in accordance with embodiments of the present invention. System 100 includes an auto-tune docker server group 102 which includes a computer 104 (i.e., an auto-tune docker server) which runs a software-based auto-tuner 106 automatically adjusts (i.e., tunes) mobile middleware configurations of MFP middleware running in Docker containers to improve the performance of the middleware. Mobile device 108-1, . . . , mobile device 108-N are connected to auto-tune docker server group 102 via a computer network (not shown), where N is an integer greater than or equal to one. Auto-tune docker server group 102 may include one or more other auto-tune docker servers (not shown).

Auto-tune docker server group 102 receives parameters 110 in response to requests from mobile devices 108-1, . . . , 108-N. For each of the aforementioned requests, parameters 110 specify a device type (i.e., an identifier of the type of mobile operating system of the mobile device that sent the request; e.g.,), a time of the request, a geographic location from which the request originates, and phone load specifying the firmware load of the mobile device that sent the request.

System 100 also includes reverse proxy container group 112, load balancer container group 114, MobileFirst Platform (MFP) container group 116, and database container group 118, each of which runs a software-based auto-tune docker agent 120. Mobile device 108-1 sends a request to reverse proxy container group 112 via a computer network (not shown). The request is also sent to load balancer container group 114, MFP container group 116, and database container group 118. Although not shown in FIG. 1, other requests may be sent from other mobile devices to reverse proxy container group 112, load balancer container group 114, MobileFirst Platform (MFP) container group 116, and database container group 118. The auto-tune docker agent 120 collects data specifying the configuration (e.g., memory and storage allocated) of the container group in which agent 120 runs and runtime data specifying the tuning parameters of the mobile middleware, which includes a combination of: the heap size of the JVM®, HTTP connections, number of execution threads, number of back-end connection threads, queue size and number of queues for Analytics servers, and session timeouts and heartbeat of MFP servers in MFP container group 116.

Computer 104 receives the aforementioned data collected by the auto-tune docker agents 120 and auto-tuner 106 analyzes the received data to determine the containers which are experiencing performance issues by determining whether the collected runtime data matches predetermined patterns.

As one example, auto-tuner 106 determines that the MFP application server for a container has slowed down, and in response, auto-tuner 106 compares the collected runtime data such as the heap size, the number of execution threads, and the number of back-end connection threads to respective predetermined threshold amounts. If the container has sufficient heap size based on the corresponding threshold amount, auto-tuner 106 increases the number of execution threads and the number of back-end connection threads to serve more requests per unit of time. If the heap size is almost fully used and if the configuration of the container allows an increase in the heap size, then auto-tuner 106 restarts the MFP application server with an increased setting for the heap size. Part of this example is further described in the discussion of FIG. 3, which is presented below.

As another example, if auto-tuner 106 detects a predetermined pattern indicating that session timeouts are occurring frequently, then auto-tuner 106 analyzes the collected runtime data to determine if the frequent session timeouts are caused by a slow back-end server that is running on configuration values (e.g., random access memory and storage capacity) that are too low. If auto-tuner 106 detects the configuration that is too low, auto-tuner 106 adjusts the timeout values.

Figure 2:
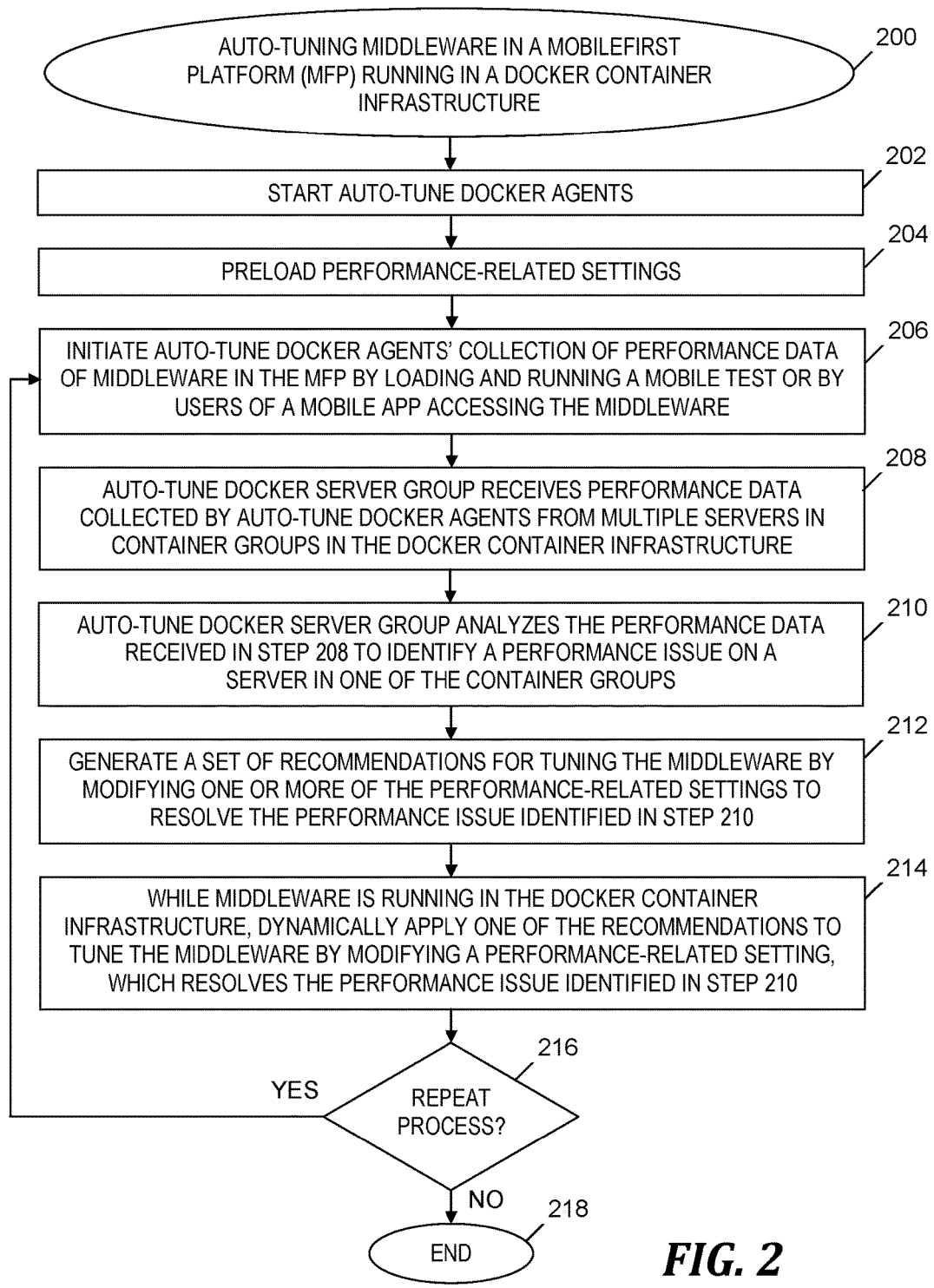
FIG. 2 is a flowchart of a process of automatically tuning middleware, where the process is implemented in the system of FIG. 1, in accordance with embodiments of the present invention.
Figure 3:
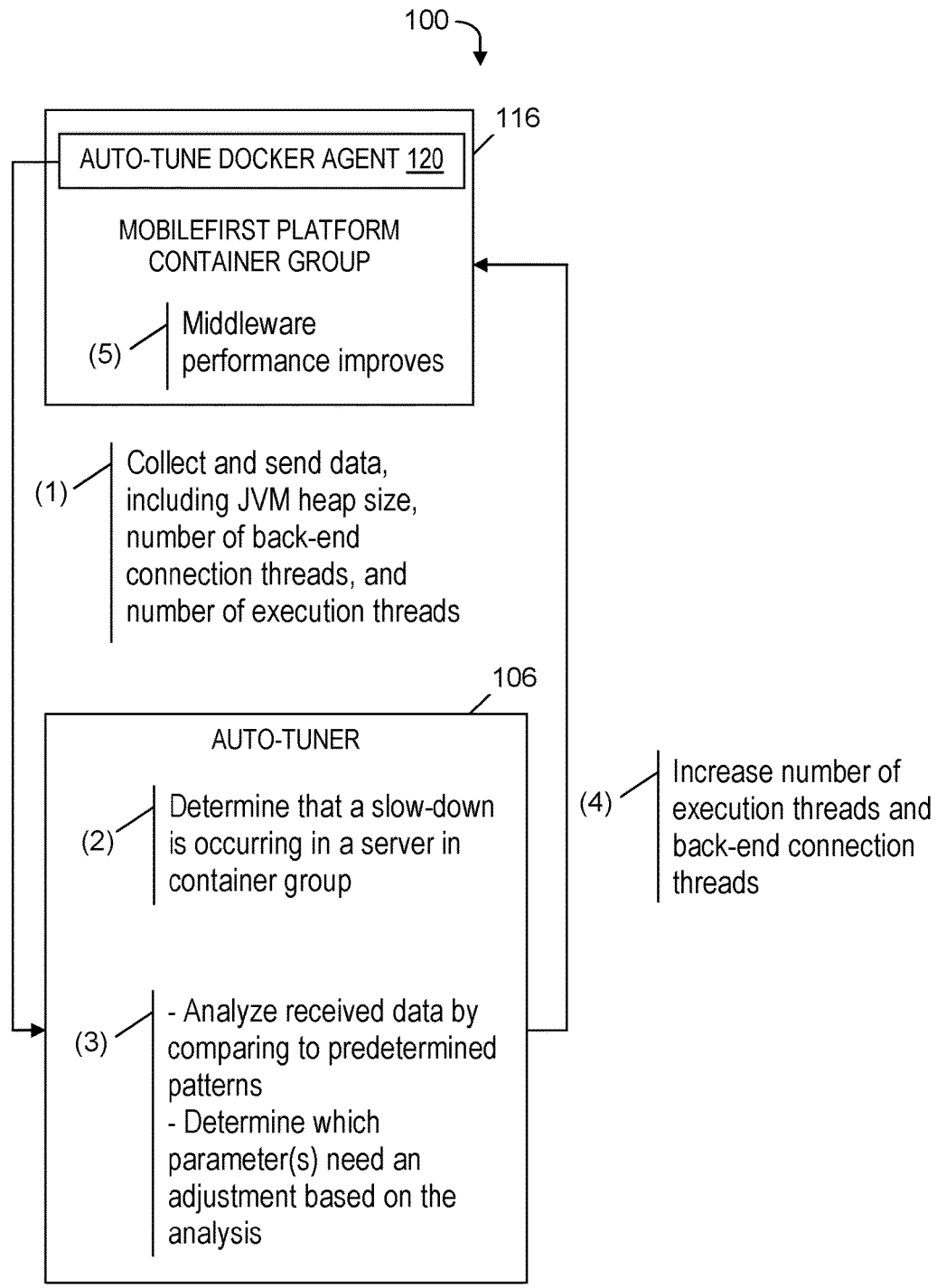
FIG. 3 is an example of automatically tuning middleware by increasing a number of execution threads and a number of back-end connection threads using steps included in the process of FIG. 2, in accordance with embodiments of the present invention.

The functionality of the components shown in FIG. 1 is described in more detail in the discussion of FIG. 2 and FIG. 3 presented below.

Process for Automatically Tuning Mobile Middleware

FIG. 2 is a flowchart of a process of automatically tuning middleware, where the process is implemented in the system of FIG. 1, in accordance with embodiments of the present invention. The process of FIG. 2 begins at step 200. In step 202, auto-tuner 106 (see FIG. 1) initiates an operation of auto-tune agents 120 (see FIG. 1).

In step 204, auto-tuner 106 (see FIG. 1) preloads performance-related settings 204 for the middleware in the MFP running in a Docker container infrastructure. Performance-related settings include initial settings for JVM heap sizes of servers included in container groups 112, 14, 116, and 118 (see FIG. 1), HTTP connections (e.g., number of execution threads and number of back-end connection threads), session timeout and heartbeat timeout values, an amount of data held in an analytics server (not shown in FIG. 1), and queue size and number of queues in the analytics server. For example, the parameters preloaded in step 204 may be based on an expectation of an amount of traffic that will be experienced by a back-end server. The performance of middleware in container groups 112, 114, 116, and 118 (see FIG. 1) which use only the preloaded parameters may not be optimal based on the number of requests from mobile apps that are received by the middleware. The subsequent steps of the process of FIG. 2 describe how the preloaded parameters are dynamically tuned to obtain optimal performance of the middleware.

In step 206, auto-tuner 106 (see FIG. 1) initiates auto-tune docker agents 120 (see FIG. 1) collecting performance data of the middleware in the MFP by (1) loading and running mobile test of a mobile app or (2) monitoring usage of the mobile app by multiple users utilizing mobile devices 108-1, . . . , 108-N (see FIG. 1), where the mobile app accesses the middleware.

In step 208, auto-tuner 106 (see FIG. 1) receives performance data collected by auto-tune docker agents 120 (see FIG. 1) from multiple servers in container groups 112, 114, 116, and 118 (see FIG. 1) in the Docker container infrastructure. The performance data may include, for example, a rate at which a server in one of the container groups 112, 114, 116, or 118 (see FIG. 1) processes requests from the mobile app or a frequency of session timeouts occurring in the server.

In step 210, auto-tuner 106 (see FIG. 1) analyzes the performance data received in step 208 to identify a performance issue on a server in one of the aforementioned container groups. The analysis in step 210 includes auto-tuner 106 (see FIG. 1) matching the performance data to predetermined patterns. A match to a particular pattern indicates a corresponding performance issue (i.e., a problem with the performance of a server included in one of container groups 112, 114, 116, or 118 (see FIG. 1)).

In step 212, auto-tuner 106 (see FIG. 1) generates a set of recommendations for tuning the middleware by modifying one or more of the performance-related settings that were preloaded in step 204. The modification of the one or more performance-related settings resolves the performance issue identified in step 210.

In step 214, while the middleware is running in the Docker container infrastructure, auto-tuner 106 (see FIG. 1) dynamically applies one of the recommendations in the set generated in step 212. Applying the recommendation in step 214 tunes the middleware by modifying one of the performance-related settings preloaded in step 204, which results in the performance issue identified in step 210 being resolved.

Example

FIG. 3 is an example of automatically tuning middleware by increasing a number of execution threads and a number of back-end connection threads using steps included in the process of FIG. 2, in accordance with embodiments of the present invention. In step (1), which is included in step 208 (see FIG. 2), auto-tune docker agent 120 collects runtime data, including JVM heap size, number of back-end connection threads, and number of execution threads for a server (i.e., a MFP application server) in MFP container group 116. Hereinafter, in the discussion of FIG. 3, the aforementioned server in MFP container group 116 is referred to simply as "the server." Step (1) also includes auto-tune docker agent 120 sending the aforementioned collected data to auto-tuner 106.

In step (2) in FIG. 3, auto-tuner 106 determines from log entries regarding requests from a mobile app processed by the server that the server is experiencing a slow-down in processing requests. Step (2) is included in step 210 (see FIG. 2).

Step (3) in FIG. 3 is included in step 210 (see FIG. 2) and is performed in response to completing step (2) in FIG. 3. In step (3), auto-tuner 106 analyzes the runtime data received in step (1) by comparing the data sent in step (1), including the JVM heap size, the number of execution threads, and the number of back-end connection threads in the server, to respective predetermined threshold amounts. In step (3), auto-tuner 106 determines that the JVM heap size is of sufficient size based on the comparison to a corresponding predetermined threshold amount. In response to determining the JVM heap size is sufficient, auto-tuner 106 determines that the number of execution threads and the number of back-end connection threads need to be adjusted in order to tune the performance of the middleware in the server.

In step (4) in FIG. 3, auto-tuner 106 sends a message to MFP container group 116 to dynamically and automatically tune the middleware in the server by increasing the number of execution threads and the number of back-end connection thread. In response to MFP container group 116 increasing the number of execution threads and the number of back-end connection threads in the server, the server in step (5) serves an increased number of requests from the mobile app per unit of time, thereby eliminating the aforementioned slow-down and improving the performance of the middleware in the server. Steps (4) and (5) are included in step 214 (see FIG. 2).

Computer System

Figure 4:
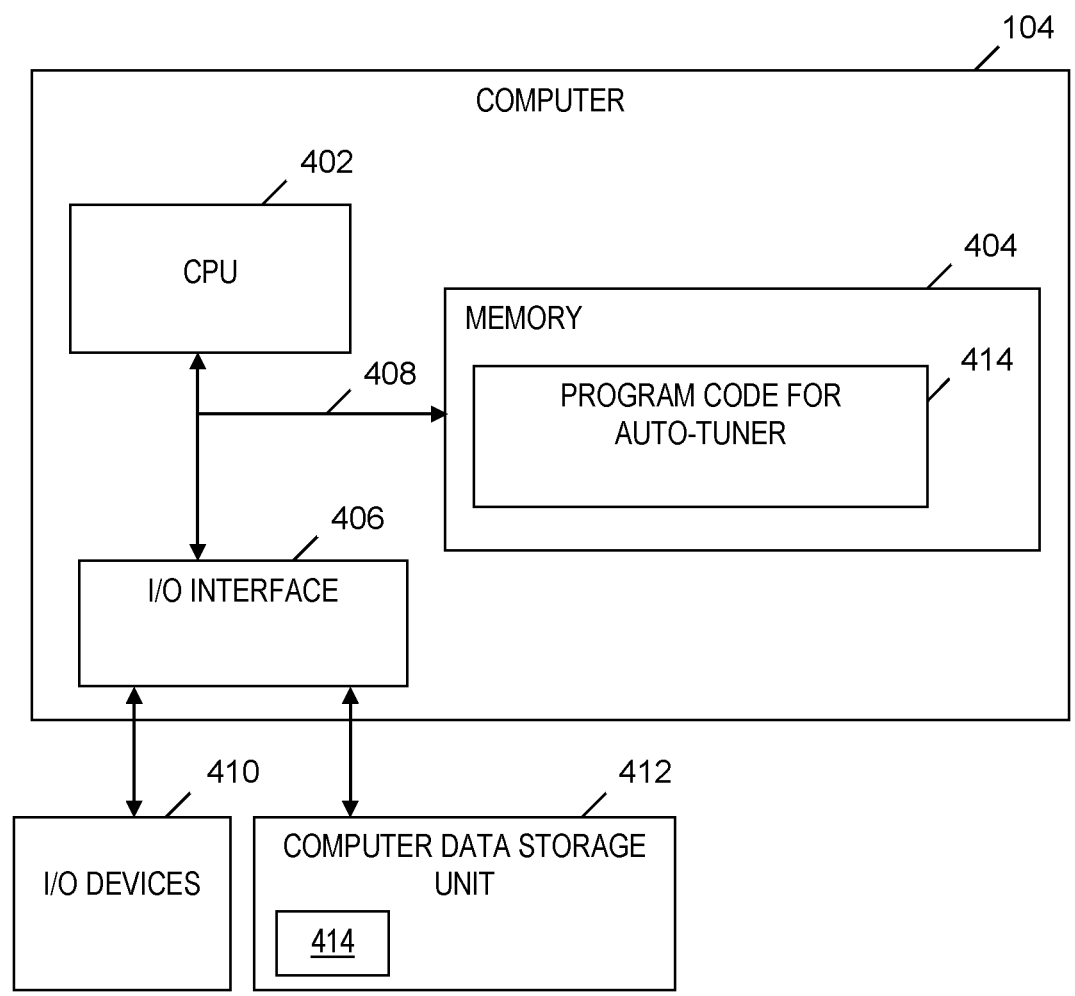
FIG. 4 is a block diagram of a computer that is included in the system of FIG. 1 and that implements the process of FIG. 2, in accordance with embodiments of the present invention.

FIG. 4 is a block diagram of a computer that is included in the system of FIG. 1 and that implements the process of FIG. 2, in accordance with embodiments of the present invention. Computer 104 is a computer system that generally includes a central processing unit (CPU) 402, a memory 404, an input/output (I/O) interface 406, and a bus 408. Further, computer 104 is coupled to I/O devices 410 and a computer data storage unit 412. CPU 402 performs computation and control functions of computer 104, including executing instructions included in program code 414 for auto-tuner 106 (see FIG. 1) to perform a method of automatically tuning middleware, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display device, keyboard, etc. Bus 408 provides a communication link between each of the components in computer 104, and may include any type of transmission link, including electrical, optical, wireless, etc.

I/O interface 406 also allows computer 104 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to automatically tune middleware. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 104 may store any combination of: parameters 110 (see FIG. 1) and performance-related settings.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to automatically tuning middleware. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 104) including one or more processors (e.g., CPU 402), wherein the processor(s) carry out instructions contained in the code causing the computer system to automatically tune middleware. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of automatically tuning middleware.

While it is understood that program code 414 for automatically tuning middleware may be deployed by manually loading directly in client, server and proxy computers (not shown) via loading a computer-readable storage medium (e.g., computer data storage unit 412), program code 414 may also be automatically or semi-automatically deployed into computer 104 by sending program code 414 to a central server or a group of central servers. Program code 414 is then downloaded into client computers (e.g., computer 104) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of automatically tuning middleware. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 104). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 104) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 104) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 104), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of tuning middleware, the method comprising the steps of:
   loading, by a computer, performance-related settings;
   receiving, by the computer, performance data specifying a performance of the middleware of a MobileFirst platform (MFP) running in a docker container infrastructure, the performance data having been collected by agents installed in container groups included in the docker container infrastructure, and the agents having collected the performance data from multiple servers included in the container groups;

based on the received performance data, identifying, by the computer, a performance issue in one of the container groups and identifying, by the computer, a server included in the one container group as being a source of the identified performance issue;

generating, by the computer, a set of recommendations for tuning the middleware by modifying one or more of the performance-related settings; and while the middleware is running in the docker container infrastructure, applying, by the computer, one of the recommendations in the set of recommendations, which modifies one of the performance-related settings which is associated with the identified server, the modified performance-related setting dynamically tuning the middleware, which resolves the identified performance issue.

2. The method of claim 1, wherein the step of loading the performance-related settings includes loading a Java Virtual Machine (JVM) heap size of the identified server, and wherein the step of applying one of the recommendations includes increasing the JVM heap size of the identified server, which tunes the middleware.

3. The method of claim 1, wherein the step of loading the performance-related settings includes loading settings specifying HyperText Transfer Protocol (HTTP) connections of the identified server, and wherein the step of applying one of the recommendations includes modifying the HTTP connections of the identified server by modifying a number of execution threads or modifying a number of back-end connection threads of the identified server, the modified number of execution threads or back-end connection threads resulting in a tuning of the middleware.

4. The method of claim 1, wherein the step of loading the performance-related settings includes loading settings specifying an internal configuration of the identified server which is included in a MFP container group, and wherein the step of applying one of the recommendations includes modifying a rate of session time-outs or heartbeat time-outs of the identified server, the modified rate of session time-outs or the heartbeat time-outs resulting in a tuning of the middleware.

5. The method of claim 1, wherein the step of loading the performance-related settings includes loading settings specifying a queue size and a number of queues of the identified server which is an analytics server, and wherein the step of applying one of the recommendations includes modifying the queue size or the number of queues, the modified queue size or the number of queues resulting in a tuning of the middleware.

6. The method of claim 1, further comprising the steps of:
determining, by the computer, that a rate of the identified server processing requests from a mobile app to the middleware decreases below a predetermined threshold rate;

in response to the step of determining that the rate of the processing the requests has decreased below the predetermined threshold rate and based on the received performance data, determining, by the computer, whether an amount of remaining space in a Java Virtual Machine (JVM) heap of the identified server is less than a predetermined threshold amount; and if the amount of the remaining space in the JVM heap is not less than the predetermined threshold amount, then increasing, by the computer, a number of execution threads and a number of back-end connection threads of the identified server, or if the amount of the remaining space in the JVM heap is less than the predetermined threshold amount, then increasing, by the computer, a JVM heap size of the identified server and restarting the mobile app.

7. The method of claim 1, further comprising the steps of:
determining, by the computer, that a frequency of session time-outs of the identified server exceeds a predetermined threshold amount;

in response to the step of determining that the frequency of the session time-outs of the identified server exceeds the predetermined threshold amount and based on the received performance data, determining, by the computer, whether a rate of processing requests by a back-end server is causing the frequency of the session time-outs to exceed the threshold amount; and if the rate of processing requests by the back-end server is causing the frequency of the session time-outs to exceed the threshold amount, then adjusting, by the computer, a timeout value associated with the session timeouts so that the session timeouts occur less frequently.

8. The method of claim 1, further comprising the step of:
providing at least one support service for at least one of creating, integrating, hosting, maintaining, and deploying computer-readable program code in the computer, the program code being executed by a processor of the computer to implement the steps of loading the performance-related settings, receiving the performance data, identifying the performance issue, identifying the server, generating the set of recommendations, and applying one of the recommendations.

9. A computer program product, comprising:
a computer-readable storage medium; and
a computer-readable program code stored in the computer-readable storage medium, the computer-readable program code containing instructions that are executed by a central processing unit (CPU) of a computer system to implement a method of tuning middleware, the method comprising the steps of:
loading, by a computer system, performance-related settings;

receiving, by the computer system, performance data specifying a performance of the middleware of a MobileFirst platform (MFP) running in a docker container infrastructure, the performance data having been collected by agents installed in container groups included in the docker container infrastructure, and the agents having collected the performance data from multiple servers included in the container groups;

based on the received performance data, identifying, by the computer system, a performance issue in one of the container groups and identifying, by the computer system, a server included in the one container group as being a source of the identified performance issue;

generating, by the computer system, a set of recommendations for tuning the middleware by modifying one or more of the performance-related settings; and while the middleware is running in the docker container infrastructure, applying, by the computer system, one of the recommendations in the set of recommendations, which modifies one of the performance-related settings which is associated with the identified server, the modified performance-related setting dynamically tuning the middleware, which resolves the identified performance issue.

10. The computer program product of claim 9, wherein the step of loading the performance-related settings includes loading a Java Virtual Machine (JVM) heap size of the identified server, and wherein the step of applying one of the recommendations includes increasing the JVM heap size of the identified server, which tunes the middleware.

11. The computer program product of claim 9, wherein the step of loading the performance-related settings includes loading settings specifying HyperText Transfer Protocol (HTTP) connections of the identified server, and wherein the step of applying one of the recommendations includes modifying the HTTP connections of the identified server by modifying a number of execution threads or modifying a number of back-end connection threads of the identified server, the modified number of execution threads or back-end connection threads resulting in a tuning of the middleware.

12. The computer program product of claim 9, wherein the step of loading the performance-related settings includes loading settings specifying an internal configuration of the identified server which is included in a MFP container group, and wherein the step of applying one of the recommendations includes modifying a rate of session time-outs or heartbeat time-outs of the identified server, the modified rate of session time-outs or the heartbeat time-outs resulting in a tuning of the middleware.

13. The computer program product of claim 9, wherein the step of loading the performance-related settings includes loading settings specifying a queue size and a number of queues of the identified server which is an analytics server, and wherein the step of applying one of the recommendations includes modifying the queue size or the number of queues, the modified queue size or the number of queues resulting in a tuning of the middleware.

14. The computer program product of claim 9, wherein the method further comprises the steps of:
   determining, by the computer system, that a rate of the identified server processing requests from a mobile app to the middleware decreases below a predetermined threshold rate;
   in response to the step of determining that the rate of the processing the requests has decreased below the predetermined threshold rate and based on the received performance data, determining, by the computer system, whether an amount of remaining space in a Java Virtual Machine (JVM) heap of the identified server is less than a predetermined threshold amount; and
   if the amount of the remaining space in the JVM heap is not less than the predetermined threshold amount, then increasing, by the computer system, a number of execution threads and a number of back-end connection threads of the identified server, or if the amount of the remaining space in the JVM heap is less than the predetermined threshold amount, then increasing, by the computer system, a JVM heap size of the identified server and restarting the mobile app.

15. A computer system comprising:
   a central processing unit (CPU);
   a memory coupled to the CPU; and
   a computer readable storage device coupled to the CPU, the storage device containing instructions that are executed by the CPU via the memory to implement a method of tuning middleware, the method comprising the steps of:
      loading, by a computer system, performance-related settings;
      receiving, by the computer system, performance data specifying a performance of the middleware of a MobileFirst platform (MFP) running in a docker container infrastructure, the performance data having been collected by agents installed in container groups included in the docker container infrastructure, and the agents having collected the performance data from multiple servers included in the container groups;
      based on the received performance data, identifying, by the computer system, a performance issue in one of the container groups and identifying, by the computer system, a server included in the one container group as being a source of the identified performance issue;
      generating, by the computer system, a set of recommendations for tuning the middleware by modifying one or more of the performance-related settings; and
      while the middleware is running in the docker container infrastructure, applying, by the computer system, one of the recommendations in the set of recommendations, which modifies one of the performance-related settings which is associated with the identified server, the modified performance-related setting dynamically tuning the middleware, which resolves the identified performance issue.

16. The computer system of claim 15, wherein the step of loading the performance-related settings includes loading a Java Virtual Machine (JVM) heap size of the identified server, and wherein the step of applying one of the recommendations includes increasing the JVM heap size of the identified server, which tunes the middleware.

17. The computer system of claim 15, wherein the step of loading the performance-related settings includes loading settings specifying HyperText Transfer Protocol (HTTP) connections of the identified server, and wherein the step of applying one of the recommendations includes modifying the HTTP connections of the identified server by modifying a number of execution threads or modifying a number of back-end connection threads of the identified server, the modified number of execution threads or back-end connection threads resulting in a tuning of the middleware.

18. The computer system of claim 15, wherein the step of loading the performance-related settings includes loading settings specifying an internal configuration of the identified server which is included in a MFP container group, and wherein the step of applying one of the recommendations includes modifying a rate of session time-outs or heartbeat time-outs of the identified server, the modified rate of session time-outs or the heartbeat time-outs resulting in a tuning of the middleware.

19. The computer system of claim 15, wherein the step of loading the performance-related settings includes loading settings specifying a queue size and a number of queues of the identified server which is an analytics server, and wherein the step of applying one of the recommendations includes modifying the queue size or the number of queues, the modified queue size or the number of queues resulting in a tuning of the middleware.

20. The computer system of claim 15, wherein the method further comprises the steps of:
   determining, by the computer system, that a rate of the identified server processing requests from a mobile app to the middleware decreases below a predetermined threshold rate;

in response to the step of determining that the rate of the processing the requests has decreased below the predetermined threshold rate and based on the received performance data, determining, by the computer system, whether an amount of remaining space in a Java Virtual Machine (JVM) heap of the identified server is less than a predetermined threshold amount; and if the amount of the remaining space in the JVM heap is not less than the predetermined threshold amount, then increasing, by the computer system, a number of execution threads and a number of back-end connection threads of the identified server, or if the amount of the remaining space in the JVM heap is less than the predetermined threshold amount, then increasing, by the computer system, a JVM heap size of the identified server and restarting the mobile app.

* * * * *